(12) United States Patent
Toriumi et al.

(10) Patent No.: US 9,803,604 B2
(45) Date of Patent: Oct. 31, 2017

(54) MOUNTING TOOL WITH PLURALITY OF RING BAND PORTIONS WITH CONCAVE PORTIONS AND NOTCHES FOR CLAMPING AN INJECTOR

(71) Applicant: Piolax, Inc., Yokohama-shi (JP)

(72) Inventors: Katsuya Toriumi, Yokohama (JP); Takeshi Kuroda, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 462 days.

(21) Appl. No.: 14/361,282

(22) PCT Filed: Oct. 11, 2012

(86) PCT No.: PCT/JP2012/006530
§ 371 (c)(1),
(2) Date: May 28, 2014

(87) PCT Pub. No.: WO2013/080423
PCT Pub. Date: Jun. 6, 2013

(65) Prior Publication Data
US 2014/0325809 A1    Nov. 6, 2014

(30) Foreign Application Priority Data

Nov. 29, 2011 (JP) .................................. 2011-260097

(51) Int. Cl.
*F02M 61/14* (2006.01)
*F16B 2/24* (2006.01)
(Continued)

(52) U.S. Cl.
CPC ............ *F02M 61/14* (2013.01); *F02M 61/16* (2013.01); *F16B 2/24* (2013.01); *F02M 55/02* (2013.01); *Y10T 29/53991* (2015.01)

(58) Field of Classification Search
CPC .... B25B 3/00; B25B 1/00; B25B 5/00; F02M 55/02; F02M 61/14; F02M 61/16;
(Continued)

(56) References Cited

U.S. PATENT DOCUMENTS 1,436,882 A * 11/1922 Knepper ............. F16L 37/1225
285/319
3,479,069 A * 11/1969 Sedam ................ F16L 37/1225
285/364
(Continued)

FOREIGN PATENT DOCUMENTS

CN 101255839 A 9/2008
CN 201486718 U 5/2010
(Continued)

OTHER PUBLICATIONS

Chinese Office Action dated Dec. 28, 2015 with an English translation thereof.
(Continued)

*Primary Examiner* — Joseph J Hail
*Assistant Examiner* — Arman Milanian
(74) *Attorney, Agent, or Firm* — McGinn IP Law Group, PLLC.

(57) ABSTRACT

In a mounting tool for mounting an injector on a cylinder head of an engine by being engaged with the injector connected to a fuel pipe, and urging the injector toward the cylinder head, a first band portion has a ring shape so as to surround an outer circumference of the injector, and is disconnected in a circumferential direction by a slit. A second band portion has a ring shape so as to surround the outer circumference of the injector, is disconnected in the circumferential direction by a slit, and is arranged adjacent to the first band portion in an axial direction. Plural elastic band portions connect the first band portion and the second
(Continued)

band portion in the axial direction. The mounting tool is made of a single metallic plate.

17 Claims, 3 Drawing Sheets

(51) Int. Cl.
*F02M 61/16* (2006.01)
*F02M 55/02* (2006.01)

(58) Field of Classification Search
CPC ..... F02M 2200/8023; F02M 2200/853; F02M 2200/856; F16B 2/24; F16L 37/1225; Y10T 29/53991; Y10T 24/44923; Y10T 24/1457
USPC .................. 29/235–283; 123/470; 403/286
See application file for complete search history.

(56) References Cited

U.S. PATENT DOCUMENTS

| | | | | |
|---|---|---|---|---|
| 3,881,753 | A * | 5/1975 | Bochory | F16B 2/245 285/114 |
| 3,945,669 | A * | 3/1976 | Bochory | F16B 2/245 285/305 |
| 5,350,201 | A * | 9/1994 | Bynum | F16L 19/005 285/330 |
| 5,501,195 | A * | 3/1996 | Hall | F02M 61/145 123/470 |
| 5,909,725 | A * | 6/1999 | Balsdon | F02M 25/0836 123/470 |
| 5,970,953 | A * | 10/1999 | Lorraine | F02M 69/465 123/456 |
| 6,186,123 | B1 * | 2/2001 | Maier | F02M 53/04 123/470 |
| 6,276,339 | B1 * | 8/2001 | Shebert, Jr. | F02M 61/14 123/470 |
| 6,846,023 | B2 * | 1/2005 | Ebinger | F16L 37/1225 24/563 |
| 7,210,462 | B2 * | 5/2007 | Scheffel | F02M 35/10 123/470 |
| 7,373,926 | B2 * | 5/2008 | Eckbauer | F02M 55/00 123/470 |
| 7,406,946 | B1 * | 8/2008 | Watanabe | F02M 55/005 123/456 |
| 7,540,273 | B2 * | 6/2009 | Scheffel | F02M 61/14 123/470 |
| 7,581,530 | B2 * | 9/2009 | Scheffel | F02M 61/14 123/470 |
| 7,802,559 | B2 * | 9/2010 | Furst | F02M 61/14 123/470 |
| 9,115,679 | B2 * | 8/2015 | Roseborsky | F02M 61/14 |
| 2002/0071718 | A1 * | 6/2002 | Marty | F16L 37/1225 403/293 |
| 2002/0157648 | A1 * | 10/2002 | Reiter | F02M 61/14 123/470 |
| 2004/0194764 | A1 * | 10/2004 | Okajima | F02M 61/14 123/469 |
| 2004/0247381 | A1 * | 12/2004 | Bruckner | F01N 13/1805 403/286 |
| 2008/0118304 | A1 * | 5/2008 | Carraher | B25H 3/04 403/396 |
| 2008/0258462 | A1 * | 10/2008 | Kumakawa | F16L 23/04 285/331 |

FOREIGN PATENT DOCUMENTS

| | | |
|---|---|---|
| JP | 2003-286926 A | 10/2003 |
| JP | 2004-211677 A | 7/2004 |
| JP | 2004-286010 A | 10/2004 |
| JP | 2005-106081 A | 4/2005 |

OTHER PUBLICATIONS

International Search Report (ISR) (PCT Form PCT/ISA/210), in PCT/JP2012/006530 dated Nov. 6, 2012.
International Preliminary Examination Report (IPER) in PCT/JP2012/006530 dated Dec. 24, 2013.

* cited by examiner

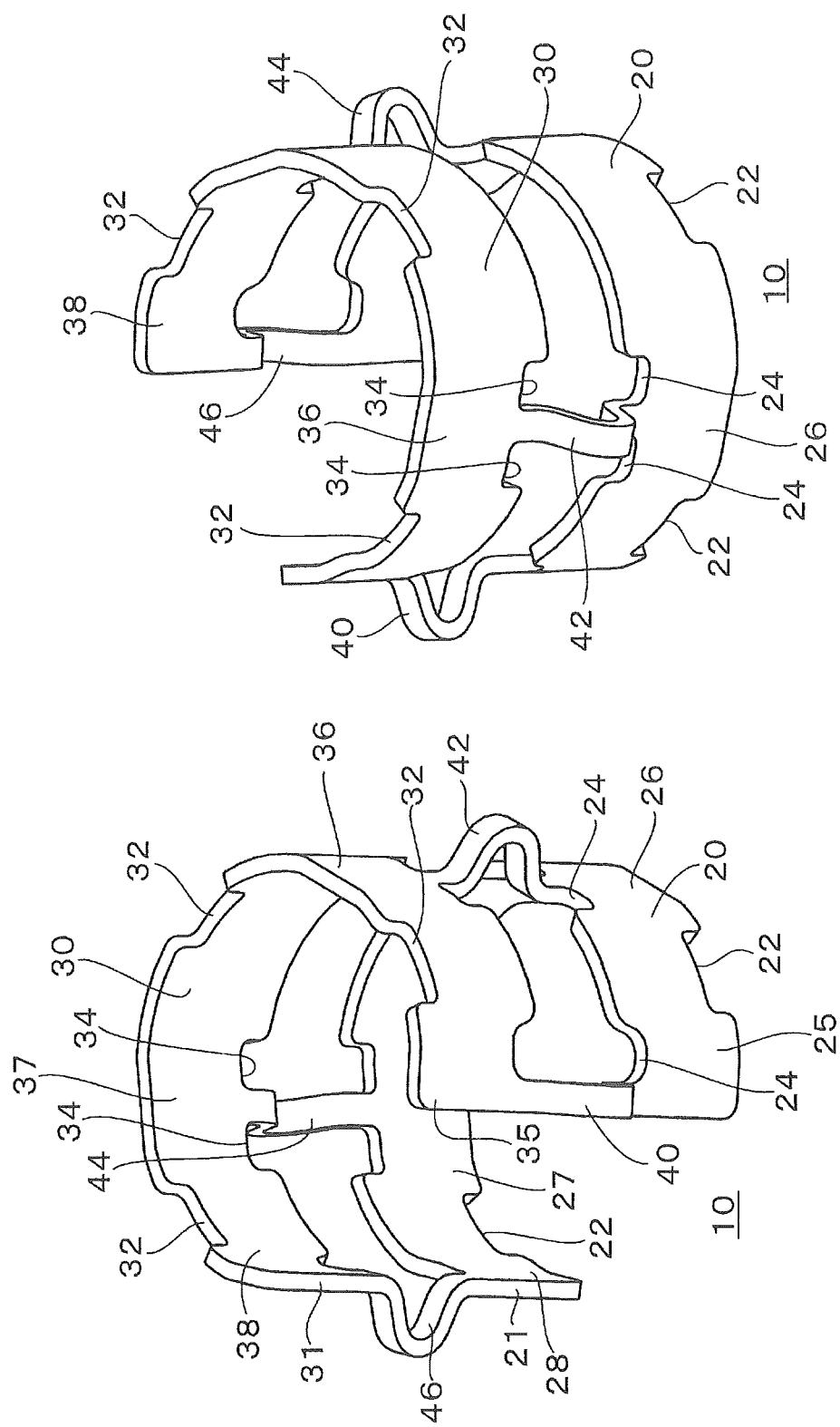

MOUNTING TOOL WITH PLURALITY OF RING BAND PORTIONS WITH CONCAVE PORTIONS AND NOTCHES FOR CLAMPING AN INJECTOR

TECHNICAL FIELD

The present invention relates to a mounting tool for mounting an injector.

BACKGROUND ART

A mounting tool for mounting an injector that injects fuel into an engine of a vehicle on a fuel pipe and a cylinder head of the engine is used (see Patent Document 1). Patent Document 1 discloses a clamp including right and left arm portions that are elastically brought into contact to be engaged with lateral sides of the injector, and a connecting portion that connects both of the arm portions. The arm portions of the clamp include three long holes and four slits in a direction perpendicular to the axial direction, and six beams in order to provide a predetermined elastic force to the clamp.

CITATION LIST

Patent Literature

Patent Document 1
JP-2005-106081-A

SUMMARY OF THE INVENTION

Problem that the Invention is to Solve

The clamp described in Patent Document 1 has a complicated shape because the arm portions include six beams. For this reason, punching of a metallic plate in the process of producing the clamp is not easy.

The present invention is made in view of the above problem, and an object of the present invention is to provide a mounting tool that has a simple shape and is made of a metallic plate, which can be simply manufactured through the punching.

Means for Solving the Problem

In order to solve the problem described above, an aspect of the present invention provided a mounting tool for mounting an injector on a cylinder head of an engine by being engaged with the injector connected to a fuel pipe, and urging the injector toward the cylinder head, the mounting tool including: a first band portion being formed in a ring shape so as to surround an outer circumference of the injector, and having a slit formed therein to disconnect the first band portion in a circumferential direction thereof; a second band portion being formed in a ring shape so as to surround the outer circumference of the injector, having a slit formed therein to disconnect the second band portion in the circumferential direction thereof, and being arranged adjacent to the first band portion in an axial direction; and plural elastic band portions that connect the first band portion and the second band portion in the axial direction. The mounting tool is formed from a single metallic plate.

According to this embodiment, because the mounting tool has a simple shape consisting of the two band portions and the elastic band portions that connect the band portions, and is made of a single metallic plate, manufacturing costs of the mounting tool can be kept down.

Advantageous Effects of Invention

According to the present invention, the mounting tool has a simple shape, which can be simply manufactured through the punching.

BRIEF DESCRIPTION OF THE DRAWINGS

FIG. 1A and FIG. 1B are perspective views of a mounting tool according to an embodiment of the present invention.

MODE FOR CARRYING OUT THE INVENTION

Figure 2A:
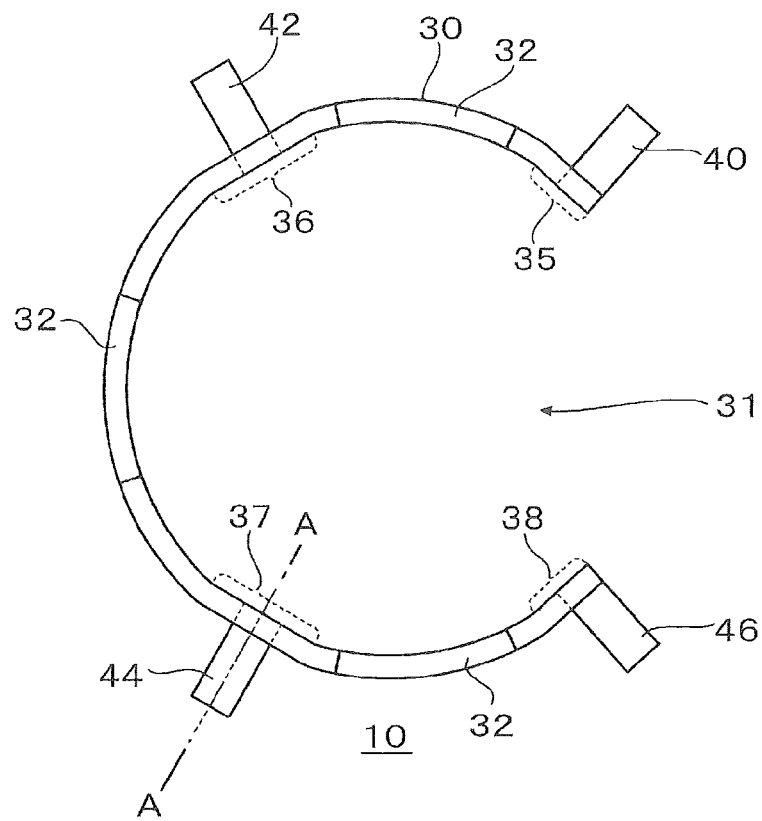
FIG. 2A is a view of the mounting tool seen from the side of its one end in the axial direction.
Figure 2B:
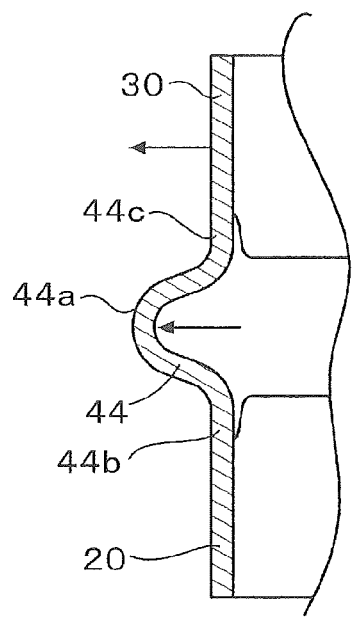
FIG. 2B is a cross-sectional view of the mounting tool taken along the line A-A of FIG. 2A.
Figure 3:
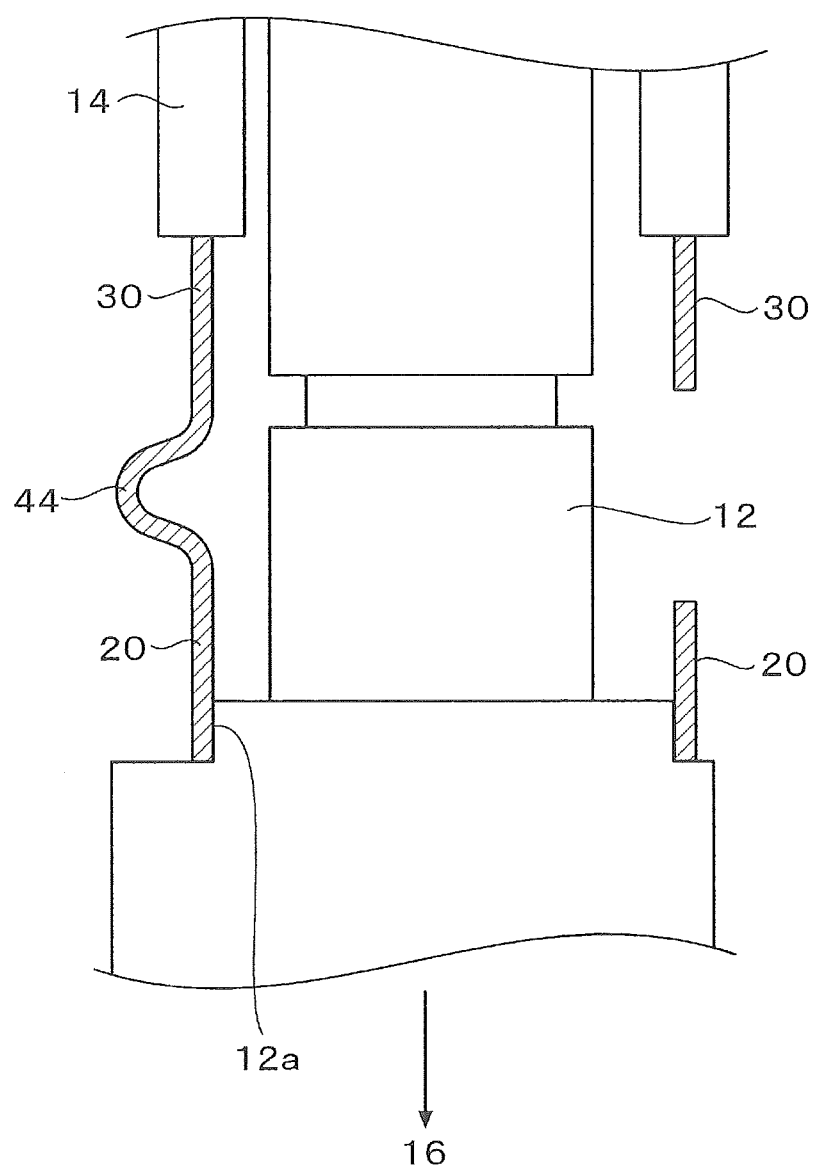
FIG. 3 is an explanatory view for illustrating a state where the mounting tool is mounted on an injector.

FIG. 1A and FIG. 1B are perspective views of a mounting tool 10 according to an embodiment of the present invention. FIG. 2A is a view of the mounting tool 10 seen from the side of its one end in the axial direction, and FIG. 2B is a cross-sectional view of the mounting tool 10 taken along the line A-A of FIG. 2A. FIG. 3 is an explanatory view for illustrating a state where the mounting tool 10 is mounted on an injector 12. Same or equivalent components and members shown in the drawings are provided with same reference numerals, and repeated descriptions of the same or equivalent components and members are omitted as appropriate.

The mounting tool 10 is used for mounting the injector 12 connected to a fuel pipe on a cylinder head of an engine, and functions as a supporting member of the injector 12. The cylinder head corresponds to a fuel inlet of the engine. One end of the injector 12 is connected to a fuel pipe outlet 14 while the other end is connected to the cylinder head of the engine. The injector 12 has a cylindrical shape, and includes a signal input port (not illustrated) to which driving signals are inputted on its side surface. The mounting tool 10 is engaged with the cylindrical injector so as to surround the side surface of the cylindrical injector.

As shown in FIG. 3, one end of the mounting tool 10 is in contact with the pipe outlet 14 while the other end is in contact with the injector 12, and the mounting tool 10 urges the injector 12 toward the direction 16 of the cylinder head. The injector 12 is mounted on the cylinder head by being pressed against the cylinder head by the mounting tool 10. In addition, the mounting tool 10 is engaged with an annular step portion 12a of the injector 12.

The mounting tool 10 includes a first band portion 20, a second band portion 30, a first elastic band portion 40, a second elastic band portion 42, a third elastic band portion 44, and a fourth elastic band portion 46 (which may be collectively referred to as "elastic band portions"). The mounting tool 10 is produced by punching and pressing a single metallic plate. Thus, the mounting tool 10 has a simple shape consisting of the two band portions and the elastic band portions that connect the band portions, and is made of a single metallic plate so that manufacturing costs of the mounting tool 10 can be kept low. The "band" means that it is formed from a member having a thin plate shape.

The first band portion 20 has a ring shape so as to surround an outer circumference of the injector, and a slit 21 is formed therein to disconnect the first band portion 20 in the circumferential direction. The second band portion 30 has a ring shape so as to surround the outer circumference of the injector, and a slit 31 is formed therein to disconnect the second band portion 30 in the circumferential direction. The second band portion 30 is arranged adjacent to the first band portion 20 in the axial direction so as to share the same center axis therewith. When the mounting tool 10 is engaged with the injector, the first band portion 20 and the second band portion 30 share the same center axis with the injector.

The first band portion 20 and the second band portion 30 are the same in shape, and have a plate shape. The plural elastic band portions connect the first band portion 20 and the second band portion 30 in the axial direction such that the first band portion 20 and the second band portion 30 are of a monolithic construction. The plural elastic band portions have elasticity in a direction of enabling the first band portion 20 and the second band portion 30 to get closer to each other, and are formed in a band shape. The plural elastic band portions are disposed parallel to each other. The first band portion 20 and the second band portion 30 have the same shape such that the mounting tool 10 is symmetrical in the axial direction. Thus, a worker can easily mount the mounting tool 10 regardless of top and bottom.

The first band portion 20 includes first flat portions 25, 26, 27 and 28 having a flat shape (which may be collectively referred to as "first flat portions"). The second band portion 30 includes second flat portions 35, 36, 37 and 38 having a flat shape (which may be collectively referred to as "second flat portions"). The first elastic band portion 40 is connected to the first flat portion 25 and the second flat portion 35. That is, the plural elastic band portions are connected to the first flat portions and the second flat portions. As shown in FIG. 2A, the second flat portions have a predetermined width in the circumferential direction, and the first flat portions have the same feature. To engage the mounting tool 10 with the injector 12, the inner peripheries of the first flat portions or the second flat portions are brought into contact with the outer circumference of the annular step portion 12a of the injector 12. If the first band portion 20 and the second band portion 30 have complete curved surfaces, the engagement is not easily made unless the inner peripheries of the first band portion 20 and the second band portion 30 and the outer circumference of the annular step portion 12a of the injector 12 are manufactured to have substantially no diametrical error. On the other hand, by providing the first flat portions or the second flat portions, allowable diametrical errors of the first band portion 20 and the second band portion 30 can be increased. In addition, by providing the first flat portions or the second flat portions, the elastic band portions can be easily formed through press working.

The first band portion 20 and the second band portion 30 overlap with each other when viewed in the axial direction. The signal input port of the injector 12 protrudes from the slit of the first band portion 20 and the second band portion 30. The slit 31 of the second band portion 30 shown in FIG. 2A is formed at the second band portion 30 across a range corresponding to substantially 90 degrees in the circumferential direction. That is, the second band portion 30 has a circled shape corresponding to 270 degrees in the circumferential direction.

The first band portion 20 and the second band portion 30 may have a circled shape corresponding to more than 180 degrees in the circumferential direction. In this configuration, the engagement can be made such that the inner circumference of the first band portion 20 or the second band portion 30 holds the annular step portion 12a of the injector 12. Mounting of the injector 12 can be performed while the mounting tool 10 is engaged with the injector 12 in advance, thereby facilitating the mounting operation. The first band portion 20 and the second band portion 30 may have a circled shape corresponding to more than 240 degrees in the circumferential direction, so that a holding force to hold the annular step portion 12a can be enhanced.

As shown in FIG. 2B, the third elastic band portion 44 includes a bending portion 44a that deformably bends outward in the radial direction, a first connecting portion 44b that connects the first band portion 20 and the bending portion 44a, and a second connecting portion 44c that connects the second band portion 30 and the bending portion 44a. The first elastic band portion 40, the second elastic band portion 42, and the fourth elastic band portion 46 have the same configurations.

Since the bending portion 44a projects outward in the radial direction, when the bending portion 44a is deformed by a force applied to the mounting tool 10 in the axial direction, the bending portion 44a deforms outward in the radial direction, thereby preventing the injector 12 from being damaged. In addition, the injector 12 can be easily inserted and engaged with the mounting tool 10.

As shown in FIGS. 2A and 2B, the bending portion 44a projects outward in a direction of the normal, which is indicated as the arrow in FIG. 2B, to peripheral surfaces of the first band portion 20 and the second band portion 30 that are connected to the elastic band portions, that is, the first flat portions and the second flat portions. The elastic band portions having this shape can be made only by bending a single flat metallic plate. In addition, loads imposed on the elastic band portions can be made equal.

The first elastic band portion 40 and the fourth elastic band portion 46 are provided to the end portions of the first band portion 20 and the second band portion 30 in the circumferential direction. The second elastic band portion 42 and the third elastic band portion 44 are provided between the first elastic band portion 40 and the fourth elastic band portion 46 in the circumferential direction. Thus, the elastic band portions can be disposed at substantially regular intervals in the circumferential direction as much as possible to thereby disperse a force applied to the elastic band portions and to urge the injector 12 in a balanced manner. The elastic band portions may be disposed at regular intervals in the circumferential direction.

As shown in FIG. 2B, the third elastic band portion 44 includes the bending portion 44a that deformably bends outward in the radial direction, the first connecting portion 44b that connects the first band portion 20 and the bending portion 44a, and the second connecting portion 44c that connects the second band portion 30 and the bending portion 44a. The other elastic band portions have the same configurations as the third elastic band portion 44.

As shown in FIGS. 1A and 1B, the first band portion 20 includes plural first notches 22 at its lower edge portion. The first notches 22 are disposed between the first flat portions. The second band portion 30 includes plural second notches 32 at its upper edge portion. The second notches 32 are disposed between the second flat portions. If plural mounting tools 10 are made of a single metallic plate, matchings for connecting the plural mounting tools 10 are provided to the first notches 22 and the second notches 32. Even if burrs remain in the first notches 22 and the second notches 32 after the matchings are cut, the mounting tool 10 can be brought into contact with the injector 12 and the pipe outlet 14 in a balanced manner, because the first notches 22 and the second notches 32 are not in contact with the injector 12 and the pipe outlet 14. The first notches 22 and the second notches 32 are provided so as not to overlap with the first flat portions and the second flat portions, so that the lengths of the first flat portions and the second flat portions in the axial direction can be secured to thereby ensure the rigidity of the first band portion 20 and the second band portion 30.

As shown in FIGS. 1A and 1B, the first band portion 20 includes first concave portions 24 on sides of the portions where the first band portion 20 is connected to the elastic band portions. The second band portion 30 includes second concave portions 34 on sides of the portions where the second band portion 30 is connected to the elastic band portions. Thus, the lengths of the elastic band portions can be increased in the axial direction to thereby increase the elastic forces of the elastic band portions.

The present invention is not limited to the embodiments described above, and it is also possible to add modifications such as various kinds of design changes to the embodiments based on the knowledge of the skilled person. Embodiments including such modifications will also fall within the scope of the present invention.

DESCRIPTION OF REFERENCE NUMERALS AND SIGNS

10 Mounting tool
12 Injector
12a Annular step portion
14 Pipe outlet
20 First band portion
22 First notch
24 First concave portion
25, 26, 27, 28 First flat portions
30 Second band portion
31 Slit
32 Second notch
34 Second concave portion
35, 36, 37, 38 Second flat portions
40 First elastic band portion
42 Second elastic band portion
44 Third elastic band portion
44a Bending portion
44b First connecting portion
44c Second connecting portion
46 Fourth elastic band portion

INDUSTRIAL APPLICABILITY

The present invention relates to a mounting tool for mounting an injector, and can provide a mounting tool that has a simple shape, which can be simply manufactured through the punching.

The invention claimed is:

1. A mounting tool for mounting a cylindrically-shaped injector on a cylinder head of an engine by being engaged with the injector connected to a fuel pipe, and urging the injector toward the cylinder head, wherein the mounting tool includes a single metallic plate having a thickness that thereby defines an axial direction of the mounting tool, the mounting tool being shaped to accommodate the cylindrically-shaped injector, thereby defining a circumferential direction of the mounting tool, and a radial direction of the mounting tool as perpendicular to the axial direction and the circumferential direction, the mounting tool comprising:
  a first band portion being formed in a ring shape so as to surround an outer circumference of the injector, and including a first slit formed therein to disconnect the first band portion in the circumferential direction of the mounting tool;
  a second band portion being formed in a ring shape so as to surround the outer circumference of the injector, including a second slit formed therein to disconnect the second band portion in the circumferential direction of the mounting tool, and being arranged adjacent to the first band portion in the axial direction of the first band portion; and
  plural elastic band portions that connect the first band portion and the second band portion in the axial direction,
  wherein the first band portion comprises first concave portions on circumferential sides of portions thereof connected to the elastic band portions, the first concave portions being concaved in the axial direction,
  wherein the second band portion comprises second concave portions on circumferential sides of portions thereof connected to the elastic band portions, the second concave portions being concaved in the axial direction,
  wherein an edge portion of the first band portion includes a first notch,
  wherein an edge portion of the second band portion includes a second notch, and
  wherein, when viewed in, the axial direction:
    the first concave portions and the first notch are arranged along the circumferential direction so as not to overlap with each other; and
    the second concave portions and the second notch are arranged along the circumferential direction so as not to overlap with each other.

2. The mounting tool according to claim 1, wherein edges of the first notch and second notch are not in contact with the fuel pipe and the injector.

3. The mounting tool according to claim 1, wherein the first band portion and the second band portion comprise flat portions having a flat shape and connected to the elastic band portions,
  wherein inner peripheries of the flat portions of the first band portion and the second band portion in the axial direction are brought into contact to be engaged with the outer circumference of the injector, and
  wherein edge portions of the first band portion comprise a plurality of notches each including the first notch and the second band portion comprise a plurality of notches each including the second notch between the flat portions.

4. The mounting tool according to claim 1, wherein the plural elastic band portions respectively comprise bending portions formed to deformably bend in the radial direction of the mounting tool, and
  wherein the bending portions are continuous from peripheral surfaces of the first band portion and the second band portion, and project outward in directions of normal to the peripheral surfaces of the first band portion and the second band portion, respectively.

5. The mounting tool according to claim 1, wherein an entirety of the mounting tool includes the single metallic plate.

6. The mounting tool according to claim 1, wherein, in the axial direction, an edge of the at least one of the plural elastic band portions in the circumferential direction of the mounting tool extends from an edge of the first band portion to an edge of the second band portion.

7. The mounting tool according to claim 1, wherein, in the axial direction, an edge of the at least one of the plural elastic band portions in the circumferential direction of the mounting tool continuously extends from an edge of the first band portion to an edge of the second band portion.

8. The mounting tool according to claim 1, wherein, in the circumferential direction of the mounting tool, a portion of the first band portion and a portion of the second band portion extend between adjacent band portions of the plural elastic band portions.

9. The mounting tool according to claim 1, wherein the first concave portions extend in the circumferential direction of the mounting tool from edges of the plural elastic band portions to form indentations in the first band portion in the axial direction.

10. The mounting tool according to claim 9, wherein the second concave portions extend in the circumferential direction of the mounting tool from the edges of the plural elastic band portions to form indentations in the second band portion in the axial direction.

11. The mounting tool according to claim 10, wherein, in the circumferential direction of the mounting tool, a portion of the first band portion and a portion of the second band portion extend between adjacent band portions of the plural elastic band portions.

12. The mounting tool according to claim 11, wherein, in the circumferential direction of the mounting tool, the portion of the first hand portion extends from an edge of one of the first concave portions to an edge of another one of the first concave portions.

13. The mounting tool according to claim 12, wherein, in the circumferential direction of the mounting tool, the portion of the second band portion extends from an edge of one of the second concave portions to an edge of another one of the second concave portions.

14. The mounting tool according to claim 1, wherein, in the circumferential direction of the mounting tool, the at least one of the plural elastic band portions extends to reach to an edge of the first band portion and to reach to an edge of the second band portion.

15. The mounting tool according to claim 1, wherein, in the axial direction, at least one of the plural elastic band portions connects an edge of the first band portion in the circumferential direction of the mounting tool located at the first slit to an edge of the second band portion in the circumferential direction of the mounting tool located at the second slit.

16. The mounting tool according to claim 1, wherein, in the axial direction, an edge of the first concave portions is flush with an edge of the elastic band portions.

17. The mounting tool according to claim 16, wherein, in the axial direction, an edge of the second concave portions is flush with another edge of the elastic band portions.

* * * * *